June 3, 1952  J. GABLER  2,599,379

SCREW ACTUATED DISPENSING MECHANISM AND REFILL UNIT THEREFOR

Filed Feb. 24, 1948

Inventor

JOSEF GABLER

By
Semmes, Keegin, Robinson & Semmes
ATTORNEYS

Patented June 3, 1952

2,599,379

UNITED STATES PATENT OFFICE 2,599,379

SCREW ACTUATED DISPENSING MECHANISM AND REFILL UNIT THEREFOR

Josef Gabler, Zurich, Switzerland

Application February 24, 1948, Serial No. 10,483

6 Claims. (Cl. 222—390)

1

The present invention relates to improvements in containers for dispensing semi-fluid or pasty substances such as lotions, creams, and the like, and has particular reference to containers provided with refill units containing material to be dispensed from the container, and for resupply thereof when the initial supply is exhausted.

It is an object of the present invention to provide a container for dispensing pasty substances, employing a novel form of refill unit which may be employed only with the container of the invention.

A further object is to provide a refill unit for containers and other devices employed to dispense pasty substances constructed in such manner that it may be employed only with a particular container, preventing the substitution of refill units which may be provided by other manufactures for use with the container.

A further object is to provide a container for use in dispensing pasty substances which employs a refill unit supplied with a mechanism cooperating with the container to actuate means for discharging a pasty substance from the container.

Other objects and advantages of the present invention will be apparent from the following detailed description thereof taken in connection with the drawings, wherein.

Figure 1:
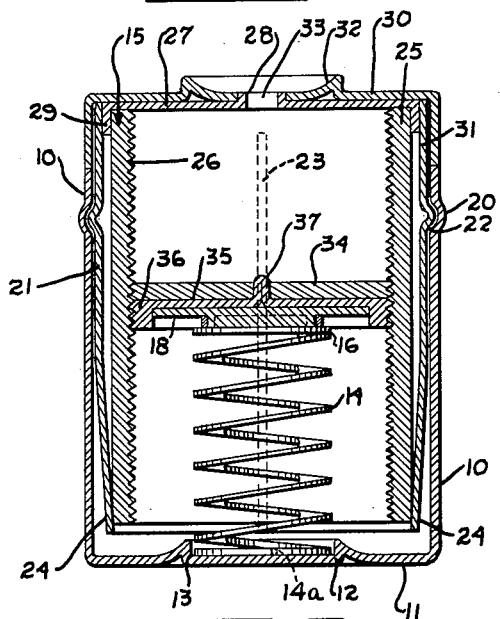
Figure 1 is a view of the invention in vertical section.

In its broadest concept, the invention comprises a container for dispensing pasty substances such as creams, lotions and the like, including an outer container, an inner container including a refill unit rotatably secured in the outer container, ejector mechanism on the outer container, a piston in the refill, and a coupling mechanism securing the ejector mechanism and refill piston in operative relationship, the coupling mechanism including a key member provided as a separate mechanism with the refill unit and adapted to be secured in mutually rotatable relationship with the refill piston prior

2 to insertion of the refill unit in the outer container, whereby dispensing of the container contents may be accomplished.

Referring to the drawings, the outer container may be in the form of a cylindrical casing 10 made of any suitable material resistant to wear and corrosion such as metal or a plastic. The casing 10 is provided with a base plate 11 formed integrally therewith and provided with an indented portion 12 forming a recess serving as a seat 13 for a spring 14 positioned centrally of the base plate 11 for compression and expansion along the longitudinal axis of the casing 10. The spring 14 is secured in the seat 13 by a pin 14a or otherwise as by welding or soldering, against radial rotation relative to the casing 10.

The spring 14 preferably is made of a strip of flat spring steel shaped in helical form. This construction has the advantage of being compressible into an extremely small space at the base of the container upon insertion of a refill unit 15 therein, whereby a maximum of available space in the container is employed for supply purposes. Also, this type of spring presents a maximum of resistance to distortion and lateral displacement upon operation of the device. The spring 14 readily carries rotational movement imparted to the base of the spring to the upper extremity 16 with a minimum of lost motion, thus acting in the capacity of a relatively fixed driving connection between the container 10 and mechanism associated with the refill unit 15, insofar as relative rotational movement is concerned.

The upper extremity or loop 16 of the spring 14 carries a coupling member 17 rigidly secured thereto comprising a base 18 provided with a plurality of raised projections 19 arranged in opposed relationship.

Figure 2:
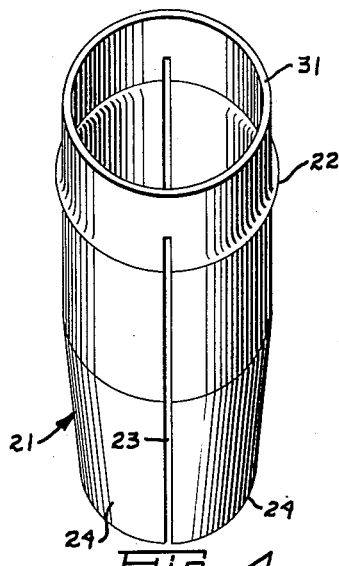
Figure 2 is a perspective view of a rotating sleeve adapted to receive and secure the refill unit in the container.

The wall of the container 10 is pressed outwardly to form a channel 20 extending around the periphery. An inner casing or sleeve 21 is provided with a peripheral indentation 22 adapted to fit into the channel 20 in the casing 10, supporting the sleeve 21 rotatably in relation thereto but securing the sleeve 21 against free relative longitudinal movement. As shown in Figure 2, the sleeve 21 is slotted longitudinally at 23 to provide for compressibility of the sleeve, whereby the sleeve may be snapped into place in the container 10. Four such slots 23 are adequate for this purpose. The lower extremity of the sleeve 21 is tapered inwardly, providing a plurality of resilient fingers 24 adapted to receive and retain the refill unit 15 in mutually rotatable relationship upon insertion in the sleeve 21.

The refill unit 15 includes a tubular member 25 threaded at 26 on the inner surface, a cap 27 having a discharge tube 28 and a rim 29 on the cap 27 adapted to engage with the upper lip of the sleeve 21 in close fitting relationship, upon insertion of the refill unit 15 in the sleeve 21. A cover 30 on the container 10 is positioned over the cap 27 and secured in frictional engagement with the upper edge 31 of the sleeve 21 which extends above the wall of the container 10, as shown in Figure 1. The cover 30 is provided with an extrusion cup 32 having a discharge orifice 33 which receives the discharge tube 28 of the refill unit cap 27. It will be observed that rotation of the container cover 30 relative to the container 10, rotates the sleeve 21 and the refill unit 15.

The tubular member 25 of the refill unit 15 is provided with a base forming a piston 34 normally forming the bottom of the refill unit 15. The piston 34 is threaded to engage with the threads 26 on the inner walls of the tubular member 25, so that the piston 34 will move longitudinally of the refill unit 15, upon relative rotation therewith. A piston support 35 extends across the under surface of the piston and is provided with a rim 36 threaded to engage with the threads 26 on the inner walls of the member 25 and thus support directly the peripheral edge of the piston. The support 35 is stamped or otherwise formed to provide an upwardly extending member 37 protruding through the piston to secure the two members in mutually rotatable relationship.

Figure 4:
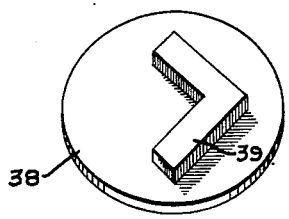
Figure 4 is a perspective view of an embodiment of key for use with the invention.
Figure 5:
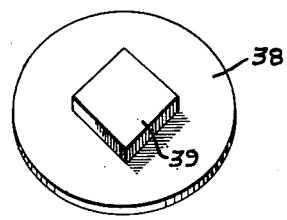
Figures 5 and 6 are perspective views of further embodiments of keys for use in association with the refill unit of the invention.
Figure 6:
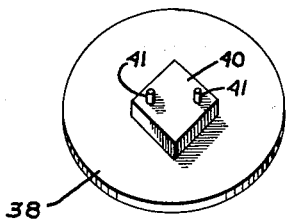

The rim 36 of the support 35 defines a chamber adapted to receive means for engaging with the coupling 17 on the upper loop 16 of the spring 14, when the refill unit 15 is inserted in the container, whereby the piston is retained in fixed relationship with the container 10 when the sleeve 21 and the refill unit 15 are rotated. The said means comprise an insert provided with each refill unit, and adapted to be placed in operative relationship with the refill unit 15 by the user, prior to insertion of each refill unit 15 in the dispenser. As shown in Figures 4 through 6, the insert may comprise a disk 38 having a projection 39 imposed on the surface thereof adapted to be received by the coupling 17. The projections 39 may be of any shape and design which will engage with the coupling 17 to form a positive mechanical connection, the invention not being limited to the precise forms illustrated in the drawings.

Figure 3:
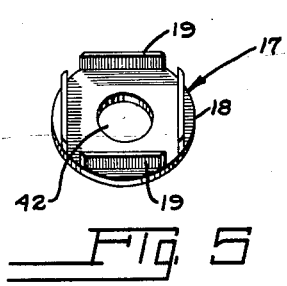
Figure 3 is a perspective view of a preferred type of coupling which may be employed.

In the embodiment shown in Figure 6, the projection 39 comprises a block 40 provided with pins 41 adapted to seat in an aperture 42 provided in the base of the coupling 17, as shown in Figure 3. This type of connection may be preferred to assist in relatively positioning the said members and to eliminate lateral play between the coupling 17 and the disk 38, when the members are assembled in operative position.

In operation, when the refill unit 15 purchased with the container 10 is exhausted, the cover 30 of the container is removed and the sleeve 21 and the refill unit 15 removed from the container 10. The exhausted refill unit 15 is removed from the sleeve 21 and a fresh unit 15 inserted therein, being seated so that the bottom of the unit 15 rests flush with the ends of the fingers 24 of the sleeve 21. The insert 38 is then placed in the chamber defined by the rim 36 of the piston support 35 in tight fitting relationship, for mutual rotation therewith, and the sleeve-refill unit assembly snapped into the container 10. The spring 14, firmly secured in the seat 13 on the base of the container 10, is compressed by the refill unit 15. The coupling 17 on the spring 14 is placed in engagement with the projection 39 on the surface of the insert 38, being brought into line by slight rotational movement of the sleeve 21 relative to the container 10 as the sleeve 21 is snapped into place. The container cover 30 is reseated over the projecting portion 31 of the sleeve 21 and when rotated by the user, rotates the sleeve 21 and the refill unit 15, the container 10 remaining relatively stationary. The piston 34 is retained in non-rotating relationship with the refill unit 15, and thus advances longitudinally of the refill unit 15 on the threads 26 to extrude pasty substance in the refill through the discharge tube 28. It will be obvious that the operation described may be reversed by maintaining the cover 30 stationary and rotating the container 10 relative thereto, whereby the piston 34 is advanced.

The container of the invention may be employed in connection with any materials of a consistency enabling extrusion thereof under moderate pressures. The container and component parts may be constructed of any materials suitable for use to accomplish the purposes described, such as plastics, light metals such as aluminum, etc.

While the invention has been described with reference to the specific embodiments thereof, it is not to be limited to the details shown for purposes of description only, save as defined in the appended claims.

I claim:

1. A device for dispensing pasty substances comprising a container, a refill unit containing a pasty substance for insertion in the container in relative axially rotatable relationship therewith, the refill unit being threaded on its inner surface, a piston in the refill unit in threaded engagement with the inner surface for movement to express the pasty substance therefrom, a longitudinally compressible coupling member associated with the container, a key member for association with the piston to engage the coupling member and secure the piston and the container in mutually rotatable relationship relative to the refill unit whereby the piston is advanced longitudinally of the refill unit upon relative rotation of the container and refill unit.

2. A device for dispensing pasty substances comprising a container, a sleeve in the container in relatively rotatable relationship therewith, a refill unit secured in the sleeve for mutual axial rotation therewith, a piston in the refill unit for expressing the pasty substance, a key associated with the piston, a coupling member on the container for engaging the key when the sleeve and refill unit are inserted in the container to secure the piston against rotation relative to the sleeve and refill unit, and means in the refill unit for advancing the piston longitudinally of the refill unit when the container is rotated relative to the sleeve and refill unit.

3. A device for dispensing pasty substances comprising a container, a sleeve in the container in relatively rotatable relationship therewith, the sleeve being slotted longitudinally to form a plurality of inwardly tapered resilient fingers, a refill unit containing a pasty substance secured by the said resilient fingers of the sleeve for mutual axial rotation of the sleeve and refill unit relative to the container, a piston in the refill unit for movement longitudinally thereof to express the pasty substance, a longitudinally compressible spring secured to the base of the container for mutual axial rotation therewith, a coupling member on the spring, a key member on the piston for engagement with the spring coupling member upon insertion of the sleeve and refill unit in the container to secure the piston and the container in mutually rotatable relationship, and means in the refill unit for advancing the piston upon relative rotation of the refill unit and the container.

4. A device for dispensing pasty substances comprising an outer container, a refill unit containing the pasty substance for insertion in the outer container in relatively rotatable relationship therewith, said refill unit being threaded on its inner surface and having a piston in threaded engagement with the inner surface forming the bottom of the refill unit, a support engaging the piston for mutual rotation therewith, and a longitudinally compressible coupling member engaging the outer container and the support for causing mutual rotation of the container and the support and adapted to follow in engagement with the support as it moves in the refill.

5. A device for dispensing pasty substances comprising an outer container, a refill unit containing the pasty substances for insertion in the outer container in relatively rotatable relationship therewith, said refill unit being threaded on its inner surface and having a piston in threaded engagement with the inner surface forming the bottom of the refill unit, a longitudinally compressible coupling member engaging the outer container and extending upwardly therefrom towards the piston, a key member secured to the upper end of the longitudinally compressible coupling member, and a non-round projection adapted to rotate integrally with the piston and extending from its lower surface for engagement with the key member whereby the piston and outer container rotate as a unit to drive the piston along the threaded walls of the refill unit for expulsion of the pasty substances therefrom.

6. A device for dispensing pasty substances comprising an outer container, a refill unit containing the pasty substances for insertion in the outer container in relatively rotatable relationship therewith, said refill unit being threaded on its inner surface and having a piston in threaded engagement with the inner surface forming the bottom of the refill unit, a helical spring engaging the outer container and extending upwardly therefrom towards the piston, a key member secured to the upper end of the helical spring, and a non-round projection adapted to rotate integrally with the piston and extending from its lower surface for engagement with the key member whereby the piston and outer container rotate as a unit to drive the piston along the threaded walls of the refill unit for expulsion of the pasty substances therefrom.

JOSEF GABLER.

REFERENCES CITED

The following references are of record in the file of this patent:

UNITED STATES PATENTS

| Number | Name | Date |
| --- | --- | --- |
| 1,569,268 | Dupre | Jan. 12, 1926 |
| 1,670,178 | Zearing et al. | May 15, 1928 |
| 2,009,761 | Calderara | July 30, 1935 |
| 2,090,018 | Armstrong | Aug. 17, 1937 |
| 2,174,421 | Krannak | Sept. 26, 1939 |